May 9, 1950 — T. HEILMANN — 2,507,014
COMBUSTION PROCESS
Filed April 29, 1947 — 2 Sheets-Sheet 1

May 9, 1950   T. HEILMANN   2,507,014
COMBUSTION PROCESS

Filed April 29, 1947   2 Sheets-Sheet 2

INVENTOR.
THORBJORN HEILMANN
BY
Pennie Edmunds Morton & Barrows
ATTORNEYS

Patented May 9, 1950

2,507,014

UNITED STATES PATENT OFFICE 2,507,014

COMBUSTION PROCESS

Thorbjorn Heilmann, Copenhagen, Denmark, assignor to Separation Process Company, Catasauqua, Pa., a corporation of Delaware Application April 29, 1947, Serial No. 744,589
In Great Britain April 29, 1946

8 Claims. (Cl. 263—53)

In burning cement in a rotary kiln or other furnace the charge is heated by a flame and may itself also contain fuel. When powdered coal is burnt to produce the flame it must be of high calorific value, and much available coal is of too low calorific value for this purpose. If this coal is subjected to a cleaning process for the purpose of obtaining a fraction of high calorific value from it, some of the combustible constituents of the coal are almost always lost. In particular, if separation is effected by a sink-and-float process in which a so-called parting liquid of specific gravity between those of two fractions into which the coal is to be separated is used, some useful constituents of the coal are lost in that part of the parting liquid which is itself inevitably lost in the subsequent separation of the coal from the parting liquid. Moreover, in general the low-grade or reject fraction obtained in the separation of such coal is wasted.

According to this invention full use is made of fuel of calorific value too low to render it suitable for combustion in the burners of rotary cement kilns in its initial state by dividing the fuel (in the form of fine coal or oil shale) into fractions of relatively high and relatively low carbon contents respectively, mixing the fraction of relatively low carbon content with the raw material fed to one end of the kiln and burning some or all the fraction of relatively high carbon content at the other end of the kiln in the kiln burner or burners. In this way there is little or no loss of combustible constituents.

It may happen that the fraction of relatively high carbon content is in excess, that is to say, not all of it is required to produce the flame required for burning a charge containing all the other fraction. In such a case the excess may be used in another kiln if desired.

The high ash contents of the fractions which form part of the kiln charge make the process unsuitable as a general rule for the manufacture of white cement, but when the fraction of relatively high carbon content is in excess the excess may advantageously be burnt in the burner of a kiln in which white cement is being made.

Although the invention may be employed in the manufacture of cement by the dry process, it is particularly useful when the cement is made by the wet process, that is to say, the raw material is slurry. In such a case some of the cement raw slurry may be used as the parting liquid in a sink-and-float process for the separation of the fuel, the float fraction of the fuel being burnt in the kiln burner or burners, and some or all of the parting liquid removed from the separating tank or the like with the fuel fractions being mixed with both additional slurry and the sink fraction of the fuel, and the mixture used as the charge which is burnt in the kiln. It may be desirable to feed back some of the parting liquid to the sink-and-float tank or the like, but it is simpler to supply all the parting liquid needed for that tank as fresh slurry and to incorporate with the charge all the parting liquid which leaves the tank with the two fractions. In the case of the sink fraction no separation of the fraction and adherent parting liquid is generally required, so that the plant necessary for the sink-and-float process is simpler than usual. In the case of the float fraction the adherent and entrained parting liquid must be removed and may then with advantage be added to the charge, or returned to the sink-and-float tank if desired, or it may even be discarded, though in such a case full advantage of the benefits and economies rendered possible by the invention is not taken.

The process will be further illustrated in the accompanying drawings, in which

Figure 1:
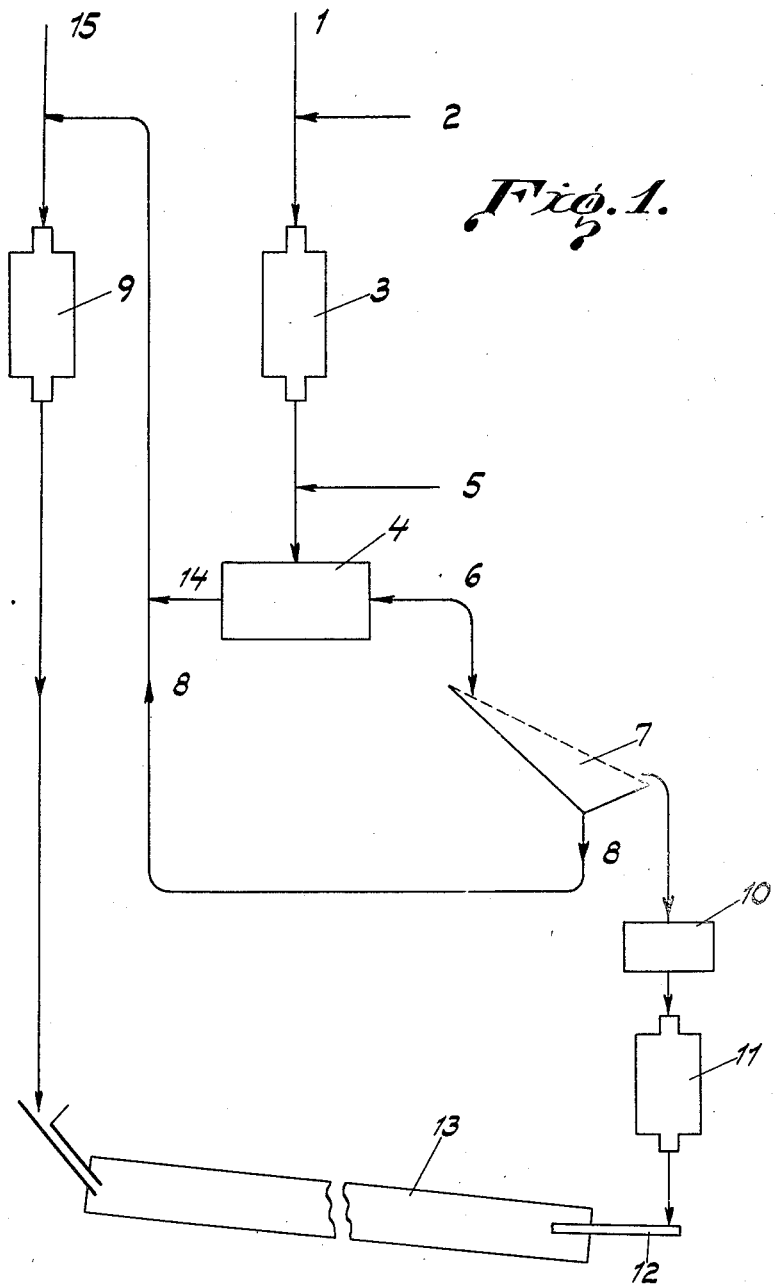
Fig. 1 is a flow sheet showing one embodiment of the invention.

In this process, as illustrated by the flow sheet of Fig. 1, cement raw materials entering the plant at 1 are mixed with water at 2 and passed to a wash mill or grinding mill 3 to form slurry. This is continuously passed to a sink-and-float tank 4, being mixed on the way with coal of low calorific value, which is fed at 5. From the tank 4 the float fraction of the coal with some of the slurry flows by way of 6 to a vibrating screen 7, through which the slurry associated with the float fraction and the very fine coal particles pass, being removed at 8 to pass to the inlet of a grinding mill 9. To ensure that substantially all the slurry fine particles are passed through the screen the float fraction and associated slurry may be diluted with water. The bulk of the float fraction of the coal passes to a drier 10 and a grinding mill 11 and then is fed to the burner 12 of a rotary kiln 13.

The sink fraction of the coal, and the slurry associated with it, passes by 14 from the tank 4 to join the slurry and fine particles on their way to the mill 9. Further cement raw material is fed at 15 to the mill 9, the constituents of the complete mixture ground in this mill being adjusted with regard in particular to the ash content of the sink fraction of the coal so that the mixture forms a suitable slurry for burning into cement. This slurry is fed to the upper end of the kiln 13.

As an example of a process carried on as shown by this flow sheet, the raw cement materials were limestone and sand, and the fuel available was coal of 45 per cent ash content. For every 10 tons of raw coal a total amount of 29 tons of limestone and 1 ton of sand were used. 15 tons of the limestone were ground in the mill 3 with enough water to yield a slurry having a specific gravity of 1.5. Thus the total weight of material passing through the tank 4 was 25 tons. From the tank 4 the float fraction of the coal amounted to 5 tons having an ash content of 20 per cent and this was associated with 10 tons slurry. The sink fraction of the coal amounted to 5 tons having an ash content of 70 per cent and was associated with 5 tons of slurry. The sink fraction of the coal, the slurry associated with it, and substantially all the parting liquid separated from the float fraction of the coal were ground with the sand and the remaining 14 tons of limestone in the mill 9 to yield 35 tons of cement raw slurry. The 5 tons of carbon-rich coal was all that was required by the burner of the kiln in burning this cement slurry.

Figure 2:
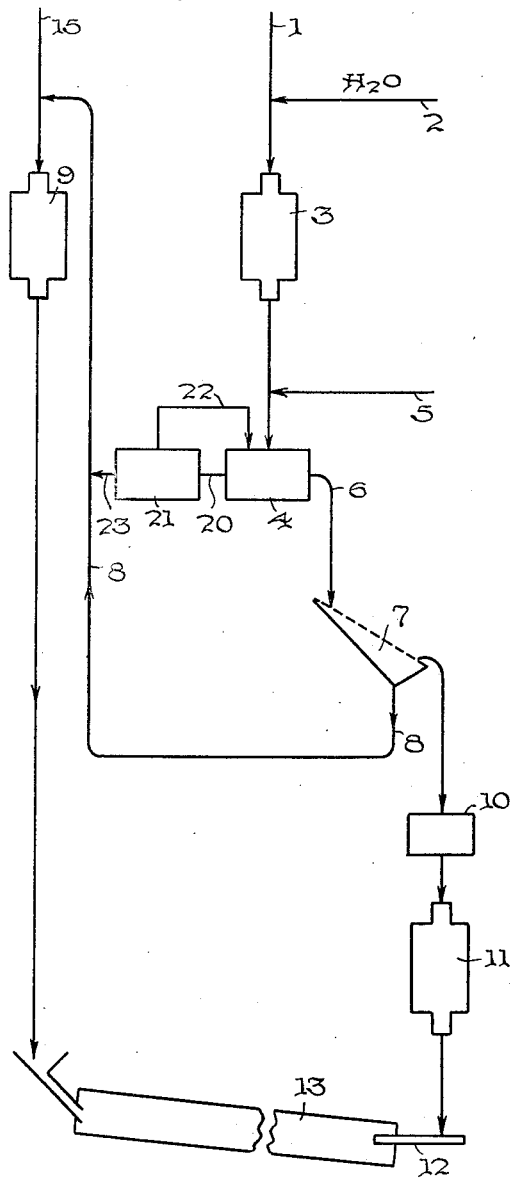
Fig. 2 is a flow sheet showing a second embodiment of the invention.

The process as carried out in accordance with the flow sheet of Fig. 2 is identical with the process described in connection with the flow sheet of Fig. 1 except that the sink fraction containing the coal of low carbon content and slurry associated therewith passes from the sink-and-float tank 4 through a conduit 20 to a separator 21 where it is treated for removal from the coal of a portion of the parting liquid which is returned to the sink-and-float tank through a conduit 22. The balance of the parting liquid, together with the coal of low carbon content, passes from the separator 21 through a conduit 23 to join the slurry and fine particles passing from the separating screen 7 to the grinding mill 9.

Figure 3:
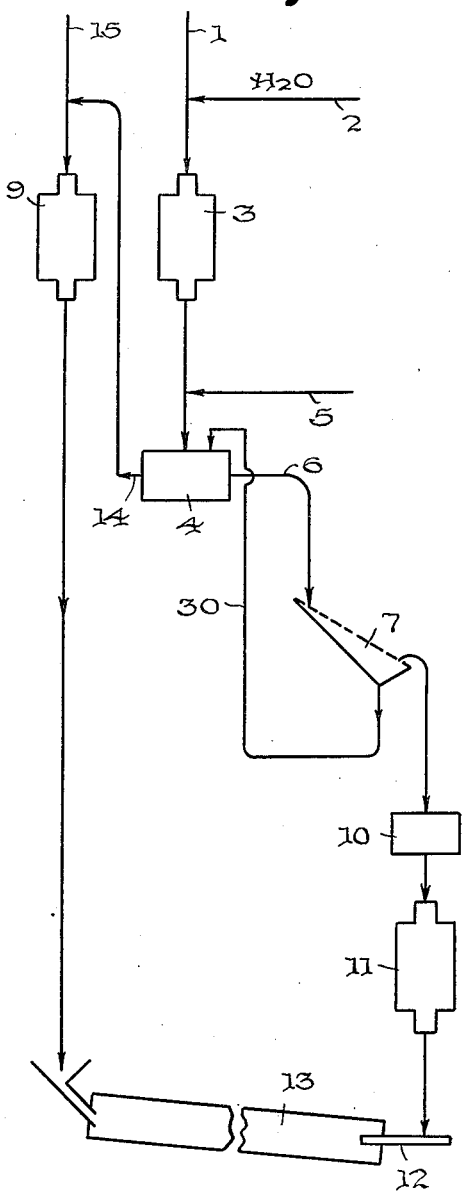
Fig. 3 is a flow sheet showing a third embodiment of the invention.

The process illustrated by the flow sheet of Fig. 3 is identical with that illustrated by Fig. 1 except that the slurry and fine particles separated from the float fraction containing the coal of high carbon content is returned through a conduit 30 to the sink-and-float tank 4 instead of passing directly to the grinding mill 9 for mixing with further cement raw materials.

I claim:

1. A process for the manufacture of cement in a rotary kiln, in which a solid fuel having an inferior calorific value is employed as the principal source of heat in the kiln, which comprises separating the solid fuel into fractions containing solid portions of the fuel of relatively high and relatively low carbon contents, respectively, by a sink-and-float gravity separation in the presence of a parting liquid of adjusted gravity consisting of an aqueous suspension of a finely divided cement raw material, blending the separated portion containing the fraction of low carbon content and at least a substantial part of the associated parting liquid with cement raw materials in proportions appropriate to produce a mixture of desired analysis, feeding the mixture to a rotary kiln, and producing cement clinker of predetermined properties by subjecting the mixture to an elevated temperature produced by introducing and burning at the discharge end of the kiln a solid fuel containing at least a part of the separated fraction of relatively high carbon content.

2. A process for the manufacture of cement in a rotary kiln, in which a solid fuel having an inferior calorific value is employed as the principal source of heat in the kiln, which comprises separating the solid fuel into fractions containing solid portions of the fuel of relatively high and relatively low carbon contents, respectively, by a sink-and-float gravity separation in the presence of a parting liquid of adjusted gravity consisting of an aqueous suspension of a finely divided cement raw material, separating a portion of the parting liquid from the gravity separated fraction of low carbon content, blending the fraction of low carbon content associated with the remainder of the parting liquid with cement raw materials in proportions appropriate to provide a mixture of desired analysis, feeding the mixture to a rotary kiln, and producing cement clinker of predetermined properties by subjecting the mixture to an elevated temperature produced by introducing and burning at the discharge end of the kiln a solid fuel containing at least a part of the separated fraction of relatively high carbon content.

3. A process for the manufacture of cement in a rotary kiln, in which a solid fuel having an inferior calorific value is employed as the principal source of heat in the kiln, which comprises separating the solid fuel into fractions containing solid portions of the fuel of relatively high and relatively low carbon contents, respectively, by sink-and-float gravity separation in the presence of a parting liquid of adjusted gravity consisting of an aqueous suspension of a finely divided cement raw material, separating a portion of the parting liquid from the gravity separated fraction of low carbon content, returning the separated parting liquid to the gravity separation, blending the fraction of low carbon content associated with the remainder of the parting liquid with cement raw materials in proportions appropriate to provide a mixture of desired analysis, feeding the mixture to a rotary kiln, and producing cement clinker of predetermined properties by subjecting the mixture to an elevated temperature produced by introducing and burning at the discharge end of the kiln a solid fuel containing at least a part of the separated fraction of relatively high carbon content.

4. A process for the manufacture of cement in a rotary kiln, in which a solid fuel having an inferior calorific value is employed as the principal source of heat in the kiln, which comprises separating the solid fuel into fractions containing solid portions of the fuel of relatively high and relatively low carbon contents, respectively, by a sink-and-float gravity separation in the presence of a parting liquid consisting of an aqueous suspension of a finely divided limestone adjusted to a gravity between the gravities of the two fractions, blending the separated portion containing the fraction of low carbon content and at least a substantial part of the associated parting liquid with cement raw materials in proportions appropriate to produce a mixture of desired analysis, grinding the mixture to a fineness suitable for producing the desired reactions in the kiln, feeding the mixture to a rotary kiln, and producing cement clinker of predetermined properties by subjecting the mixture to an elevated temperature produced by introducing and burning at the discharge end of the kiln a solid fuel containing at least a part of the separated fraction of relatively high carbon content.

5. A process for the manufacture of cement in a rotary kiln, in which a solid fuel having an inferior calorific value is employed as the principal source of heat in the kiln, which comprises separating the solid fuel into fractions containing solid portions of the fuel of relatively high and relatively low carbon contents, respectively, by a sink-and-float gravity separation in the presence of a parting liquid of adjusted gravity consisting of an aqueous suspension of a finely divided cement raw material, blending the separated portion containing the fraction of low carbon content and at least a substantial part of the associated parting liquid with cement raw materials in proportions appropriate to produce a mixture of desired analysis, separating the parting liquid from the gravity separated fraction of high carbon content, returning the separated parting liquid to the gravity separation, feeding the mixture to a rotary kiln, and producing cement clinker of predetermined properties by subjecting the mixture to an elevated temperature produced by introducing and burning at the discharge end of the kiln a solid fuel containing at least a part of the separated fraction of relatively high carbon content.

6. A process for the manufacture of cement in a rotary kiln, in which a solid fuel having an inferior calorific value is employed as the principal source of heat in the kiln, which comprises separating the solid fuel into fractions containing solid portions of the fuel of relatively high and relatively low carbon contents, respectively, by a sink-and-float gravity separation in the presence of a parting liquid of adjusted gravity consisting of an aqueous suspension of a finely-divided cement raw material, separating the parting liquid from the gravity separated fraction of high carbon content, blending the said separated parting liquid, the gravity separated portion containing the fraction of low carbon content and at least a substantial portion of the associated parting liquid and cement raw materials to produce a mixture of desired analysis, feeding the mixture to a rotary kiln, and producing cement clinker of predetermined properties by subjecting the mixture to an elevated temperature produced by introducing and burning at the discharge end of the kiln a solid fuel containing at least a part of the separated fraction of relatively high carbon content.

7. A process for the manufacture of cement in a rotary kiln, in which a solid fuel having an inferior calorific value is employed as the principal source of heat in the kiln, which comprises separating the solid fuel into fractions containing solid portions of the fuel of relatively high and relatively low carbon contents, respectively, by a sink-and-float gravity separation in the presence of a parting liquid consisting of an aqueous suspension of a finely divided limestone adjusted to a gravity between the gravities of the two fractions, blending the separated portion containing the fraction of low carbon content and at least a substantial part of the associated parting liquid with cement raw materials in proportions appropriate to produce a mixture of desired analysis, separating the parting liquid from the gravity separated fraction of high carbon content returning the separated parting liquid to the gravity separation, grinding the blended mixture to a fineness suitable for producing the desired reactions in the kiln, feeding the mixture to a rotary kiln, and producing cement clinker of predetermined properties by subjecting the mixture to an elevated temperature produced by introducing and burning at the discharge end of the kiln a solid fuel containing at least a part of the separated fraction of relatively high carbon content.

8. A process for the manufacture of cement in a rotary kiln, in which a solid fuel having an inferior calorific value is employed as the principal source of heat in the kiln, which comprises separating the solid fuel into fractions containing solid portions of the fuel of relatively high and relatively low carbon contents, respectively, by a sink-and-float gravity separation in the presence of a parting liquid consisting of an aqueous suspension of a finely divided limestone adjusted to a gravity between the gravities of the two fractions, separating the parting liquid from the gravity separated fraction of high carbon content, blending the said separated parting liquid, the gravity separated portion containing the fraction of low carbon content and at least a substantial portion of the associated parting liquid and cement raw materials to produce a mixture of desired analysis, grinding the mixture to a fineness suitable for producing the desired reactions in the kiln, feeding the mixture to a rotary kiln, and producing cement clinker of predetermined properties by subjecting the mixture to an elevated temperature produced by introducing and burning at the discharge end of the kiln a solid fuel containing at least a part of the separated fraction of relatively high carbon content.

THORBJORN HEILMANN.

REFERENCES CITED

The following references are of record in the file of this patent:

UNITED STATES PATENTS

| Number | Name | Date |
| --- | --- | --- |
| 331,243 | Joy | Nov. 24, 1885 |
| 1,323,294 | Lesley | Dec. 2, 1919 |
| 1,524,838 | Muller | Feb. 3, 1925 |
| 1,605,172 | Chance | Nov. 2, 1926 |
| 2,090,868 | Hyde | Aug. 24, 1937 |
| 2,178,456 | Pool | Oct. 31, 1939 |